Figure 9:
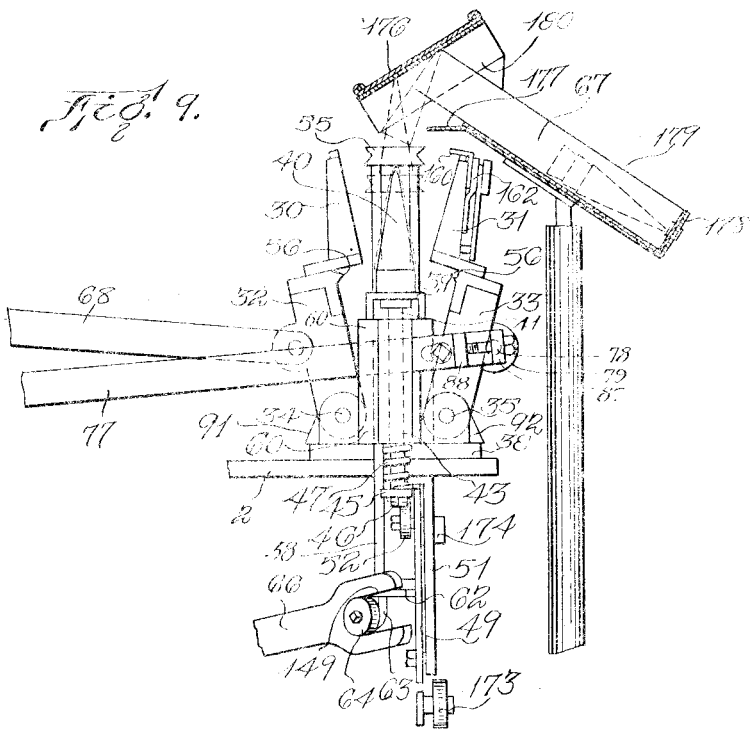

S. E. WINDER.
MACHINE FOR BAKING PASTRY CONES.
APPLICATION FILED JAN. 2, 1914.
1,119,918.
Patented Dec. 8, 1914.
4 SHEETS—SHEET 1.
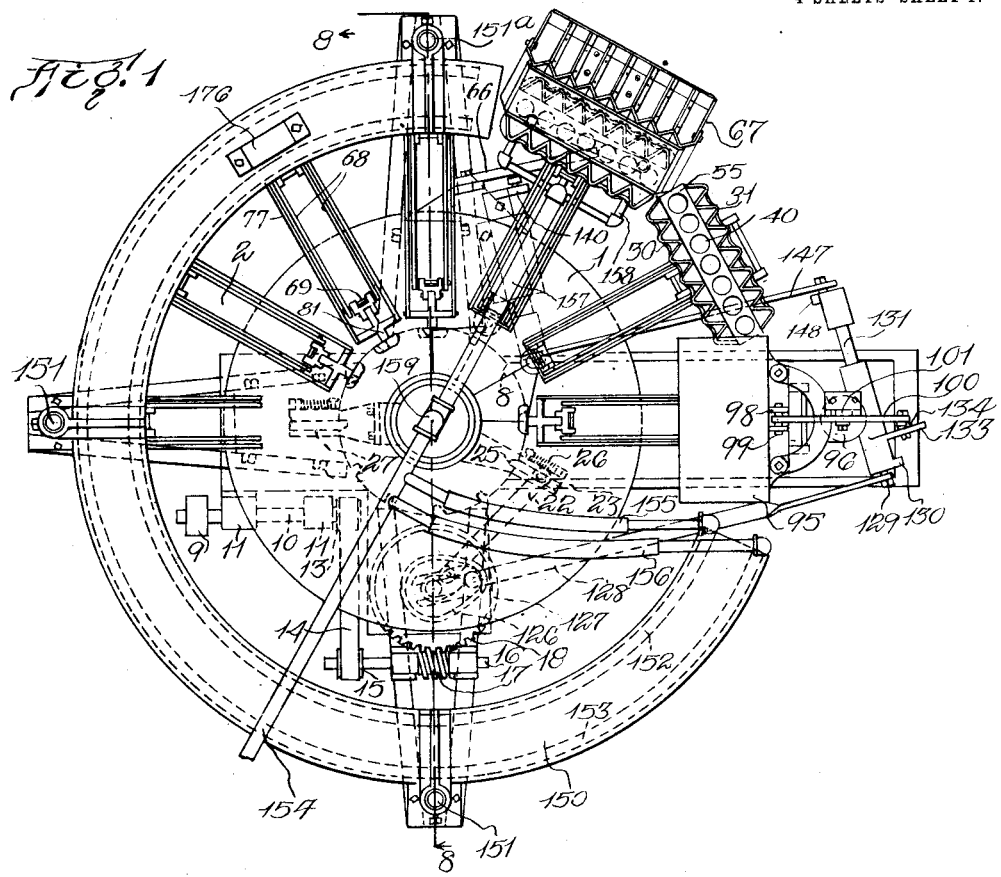
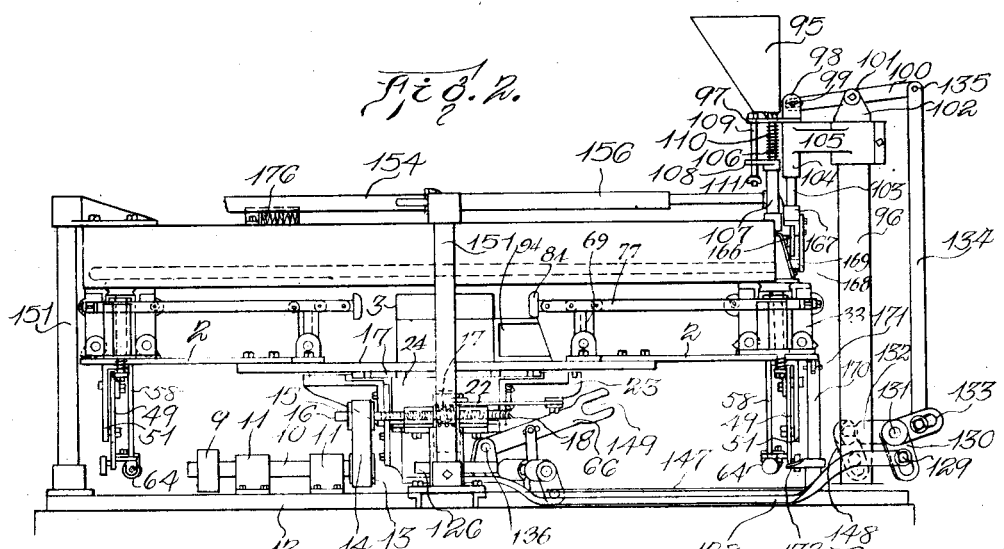

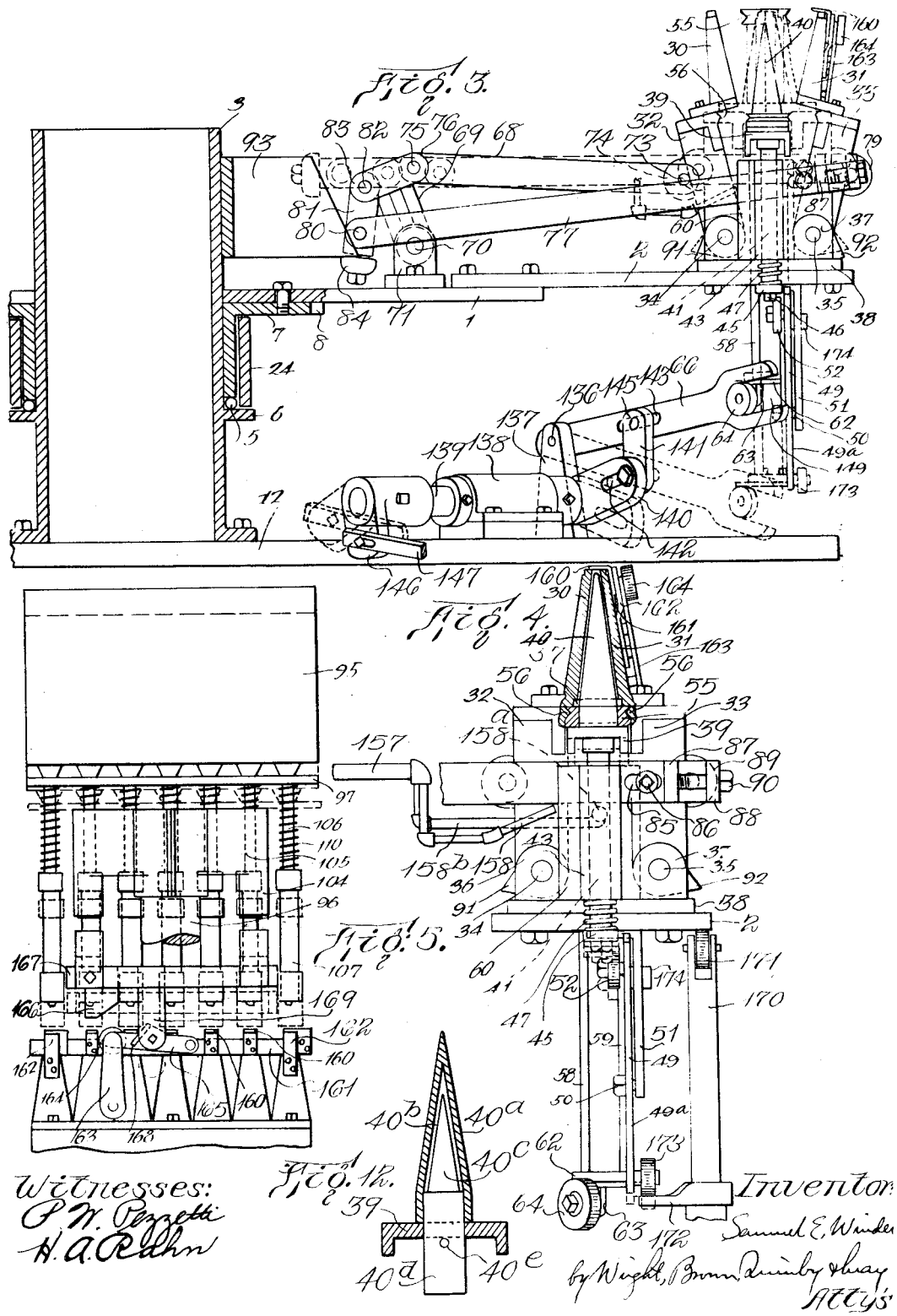

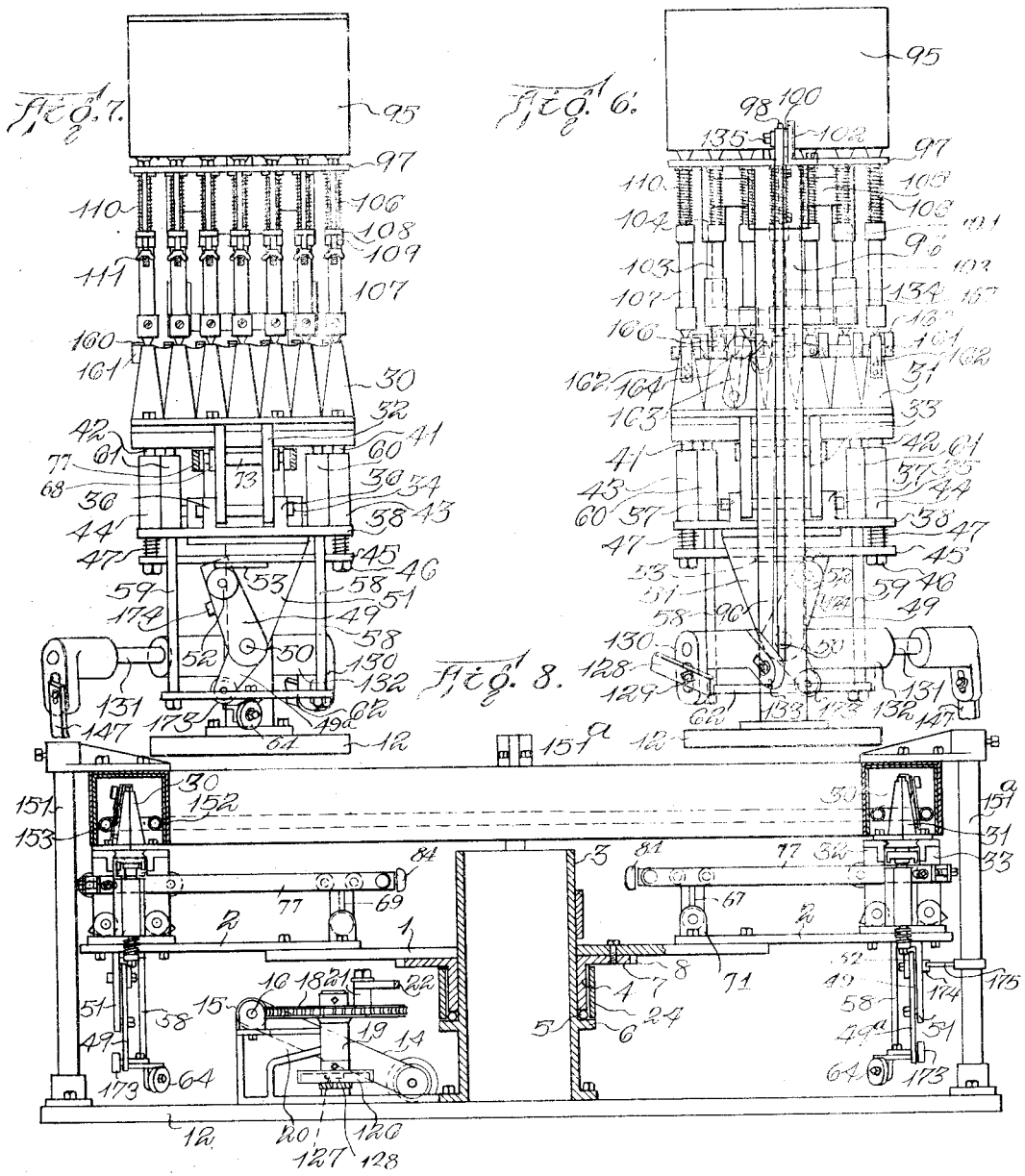

S. E. WINDER.
MACHINE FOR BAKING PASTRY CONES.
APPLICATION FILED JAN. 2, 1914.

1,119,913.

Patented Dec. 8, 1914.
4 SHEETS—SHEET 4.

UNITED STATES PATENT OFFICE.

SAMUEL E. WINDER, OF WALTHAM, MASSACHUSETTS, ASSIGNOR TO APPLETON P. WILLIAMS, OF WEST UPTON, MASSACHUSETTS.

MACHINE FOR BAKING PASTRY CONES.

1,119,918.

Specification of Letters Patent.

Patented Dec. 8, 1914.

Application filed January 2, 1914. Serial No. 810,063.

*To all whom it may concern:*

Be it known that I, SAMUEL E. WINDER, a citizen of the United States, and resident of Waltham, in the county of Middlesex and State of Massachusetts, have invented certain new and useful Improvements in Machines for Baking Pastry Cones, of which the following is a specification.

The present invention relates to a complete automatic machine for forming and baking food articles. The particular machine here illustrated is designed to produce edible cups of conical form generally known as ice cream cones, wherefore in the following description I shall refer to the machine as a machine for producing baked ice cream cones, and shall refer to the product of the machine as ice cream cones. I wish it understood that in thus designating the machine and its product I have not intended to limit the scope of the invention or to imply that the invention does not embrace a machine designed and capable of producing other articles. Indeed the invention in its broader aspects embraces machines for producing articles of any character and material which are formed in a plastic state and are caused to retain their shape by application of heat. I consider that essentially the appended claims embrace machines for producing any character of article from plastic material, whatever such material may be, however the shape of the finished article may differ from a conical form, and whatever differences the machine may embody in its construction over the construction here illustrated, provided only the fundamental principles explained in the following specification are present.

Having thus explained that the terms used to describe the articles produced by the machine have no limiting significance, but are purely descriptive, I will now state the objects of the invention.

The primary object is to provide a complete and automatic machine for producing the baked articles continuously, rapidly, and in large quantities.

Secondary objects have to do with improvements in the several parts of the machine, namely, the means for filling the molds; the construction of the molds themselves; means for delivering the baked articles from the molds; and the means for insuring the production of perfect finished articles, all as hereinafter more fully explained in the following specification in which the constructions contained in the present embodiment of my invention for carrying the foregoing objects into effect are described in detail.

In the accompanying drawings I have illustrated a machine in which my invention is embodied. This machine exemplifies in its construction the principles involved in the invention, although not necessarily representing the best and final forms of mechanical construction in which such principles may be embodied. With the understanding that the machine here represented is illustrative of the invention and is not intended to be taken as limiting the invention to any particular definite forms, I will proceed to a detailed description of such machine.

Figure 11:
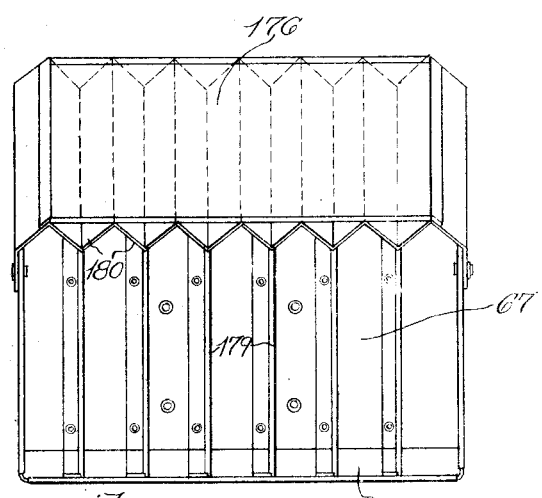
Figure 10:
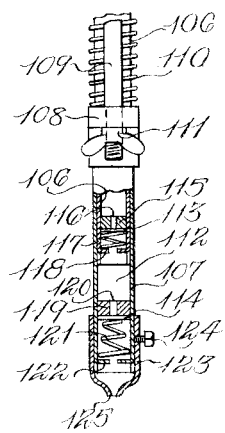

In the drawings, Figure 1 is a plan view of the machine. Fig. 2 is a side elevation of the machine. Fig. 3 is a side elevation of one of the molding elements or units of the machine showing also the mechanism for operating the parts of such unit. Fig. 4 is an elevation on a larger scale of the same unit, the mold thereof being shown in section, and the operating mechanism being omitted. Fig. 5 is a front elevation of the means by which the molds or molding devices of the machine are filled with the plastic material. Fig. 6 is a front elevation of the filling means, showing one of the molding units in position to receive the plastic material therefrom. Fig. 7 is a rear elevation of the parts shown in Fig. 6. Fig. 8 is a central cross section of the entire machine taken on line 8—8 of Fig. 1. Fig. 9 is an elevation of one of the molding units in the discharging position illustrating the operation of ejecting the finished articles. Fig. 10 is a detail sectional view of one of the devices used to measure the batter and fill one of the molds of the machine. Fig. 11 is a plan view of the receptacle into which the baked articles are automatically discharged. Fig. 12 is a detail sectional view of a form of core which I may use in the machine.

The same reference characters indicate the same parts in all the figures.

The fundamentals of the machine include a rotary carrier consisting of a central turntable 1 and a number of substantially radial arms 2, each of which supports what I may call for the purpose of description, one of the molding units. Such turntable and arms constitute a mold carrier. Each of such molding units contains a number of mold cavities, in the present case seven, and a corresponding number of plugs or cores which occupy such cavities and form the hollow interiors of the articles to be baked. Where, as in the present machine there are twelve units and each unit comprises seven mold cavities, a single complete cycle of the machine produces eighty-four cones or other articles. The turntable 1 surrounds a central post 3, and is fastened to a sleeve or hub 4 which also surrounds the post and has a rotary fit thereon. The hub 4 is supported on a ball bearing 5 resting on a ledge 6, which projects from the post. The hub has on its upper edge a flange 7 to which the table 1 is bolted and such flange has in its periphery a number of notches 8 forming the teeth of a ratchet.

Mechanism for driving the turntable with a step by step motion is illustrated in Figs. 1, 2, and 8. Power is delivered to a pulley 9 mounted on a shaft 10 which turns in bearings 11—11 fastened to the base 12 beneath the turntable. Shaft 10 carries a second pulley 13 which drives a belt 14, the latter passing also around a pulley 15 on a worm shaft 16, which carries a worm 17 meshing with a horizontal worm wheel 18 on an upright shaft journaled in a bearing 19 which forms part of a bracket 20 rising from the base 12 and carrying also the bearings for the worm shaft 16. In place of the belt drive described, it is obvious that an electric motor or other prime mover may be used, and that such prime mover is the equivalent mechanically of the mechanism described. The worm wheel 19 carries a crank pin 21 to which a connecting rod 22 is pivoted. Said rod extends to and is connected with a bracket 23 which is attached to and projects from a sleeve 24 surrounding the hub 4 and rotatably supported on ledge 6. Bracket 23 carries a pawl 25 in a plane of the flange 7, which pawl is pressed toward the flange by a spring 26 and is adapted to enter the notches 8 in the periphery of such flange. Each complete rotation of the wheel 18 moves the pawl back and forth and thereby moves or turns the turntable through one step of its rotation and brings the pawl back where it engages the next notch. The notches are inclined on one side in the manner of ratchet teeth, whereby the pawl is automatically withdrawn upon the backward throw. A locking pawl 27 is provided at a convenient point to engage one of the notches and prevent the turntable from being moved backward when the pawl is carried back from one notch to the next. The number of notches is equal to the number of molding units, so that each cycle of operations of the pawl places the turntable so that one molding unit is in position to be filled and another unit is in the discharging position; and the turntable remains stationary while the pawl is moved back to the next notch, for a long enough period to allow the empty unit to be filled and the baked contents of the unit which is in the discharging position to be discharged.

I will now describe one of what I call the molding units, of which as previously stated, there are twelve in the entire machine, each being a duplicate of the others. Such unit comprises two half molds, 30, 31 mounted respectively upon frames or holders 32, 33 which are adapted to swing about parallel pivots 34, 35, respectively, such pivots being mounted in lugs 36, 36 and 37, 37, respectively, which rise from a base plate 38 secured to one of the arms 2 of the turntable. The frames 32, 33 are mounted between the lugs which hold their respective pivots, as appears from Figs. 6 and 7. Each of the half molds contains cavities, the number of which in this instance is seven, each conforming in shape to the exterior of half of the article to be molded. The corresponding cavities of the half molds register with one another so that when these half molds are brought together as shown in Fig. 4, they provide a number of complete and distinct molding chambers which, when the machine is designed to produce conical cups, as in the present case, are conical in form. The molds are so formed and arranged in the present machine that the largest diameter of the chambers is at the bottom and the walls of such chambers converge upwardly to the top. The cavities or chambers extend to the upper limits of the half molds so that when such molds are brought together small orifices are provided opening into the molding chambers and having sufficient size to admit the batter.

Between the swinging frames 32 and 33 is arranged a crossbar 39, which supports cores or plugs 40 designed to give the desired internal formation to the baked articles. When such articles are conical cups the plugs 40 are cones. The cores are equal in number to the molding chambers and are so spaced that each core is coaxial with its respective chamber when the half molds are closed. In normal position the cores occupy the corresponding molding chambers centrally and provide narrow spaces between the cores and the walls of the corresponding chambers of sufficient dimension to give the walls of the finished cups the desired thickness. The upper ends of the cores terminate sufficiently far below the external orifices of the molding chambers to permit the batter to cover the cores and thereby form closed bottoms in the cups. Rods 41 and 42 are connected with the crossbar 39 and extend downwardly therefrom through the base plate 38 and through guides 43, 44, respectively, on said base plate. The lower ends of said rods which protrude below the base plate 38 pass through a bar 45 and have heads or nuts 46 underlying and bearing on the under side of said bar. Springs 47 surround the rods between the plate 38 and the bar 45 and press down upon the bar 45, tending to lower the same and so to withdraw the cores from the molds. This tendency is resisted by a lever 49, which is pivoted on a stud 50 carried by a bracket 51 which extends downwardly from the base plate 38. The lever 49 carries a roll 52 underlying the crossbar 45 and bearing on a contact plate 53 attached to or formed integrally with the under side of the bar 45. When the lever 49 is upright, which is its normal position, it rigidly supports the cores in the proper position within the mold cavities. When said lever is displaced to the position shown in Figs. 6 and 7, by means hereinafter described, it permits the springs 47 to withdraw the cores to a limited extent, which is only sufficient to free them from the baked articles, and is not enough to remove the cores entirely, or nearly so, from the mold cavities.

The cores shown in Figs. 3, 4, and 9 may be solid or hollow as preferred. When they are made as solid blocks or bars they are attached to the crossbar or plate 39 by screws passing upwardly through said crossbar and tapped into the bases of the cores. I have designed a special form of core, illustrated in Fig. 12 which is provided with means whereby heat may be conducted to its interior, whereby to accomplish the baking of the cups more quickly than could otherwise be done. The hollow core is designated 40ª and consists of a shell having an internal cavity 40ᵇ of substantially the same form as the external surface. A plug 40ᶜ is provided which passes through the crossbar or plate 39 and into the base of the hollow core 40ª, having a tight driving fit in such hollow core. The plug 40ᶜ is tapered or otherwise shaped in conformity with the outline of the chamber 40ᵇ of the core and its end extends well into the tip of the core. The base 40ᵈ of the plug 40ᶜ passes downward and is acted upon by the flame from a gas jet or other heating agent hereinafter described, being thereby highly heated, and serving to conduct heat into the core and radiate heat to the walls of the core, whereby to bake the interior of the cup or ice cream cone at the same time that the exterior of such cup or cone is being baked. The core is retained in place by a pin 40ᵉ driven through the base of the plug close to the under side of the crossbar 39. This pin prevents the plug from being lifted out of the crossbar, while the tight fit of the core on the lug prevents the plug from falling out of the crossbar and also prevents the core from being lifted. At the same time removal of the core when necessary is made a very simple operation, since all that is needed is to drive out the pin 40ᵃ, when the core and plug together can be lifted from the crossbar.

The rims of the cups baked in the machine are defined and the cups are ejected by a member 55 (see Fig. 4) which lies above the cross bar 39 between the frames 32 and 33 and extends throughout the length of the molding unit. This member is a bar or plate having apertures to receive the several cores or plugs 40, which apertures are of the same size as the greatest diameter of said plugs, in which the latter have a close sliding fit. The lower ends of the cores are preferably cylindrical, as shown in Fig. 5, so that such cores may move slightly up and down within the member 55, and when raised as shown by full lines in Fig. 4, will entirely fill the apertures in the member 55 and prevent the batter from working between them and the member 55. Said member 55, which will hereafter be called the ejector, for convenience of description, is locked in the position shown in Fig. 4 when the half molds are brought together. The locking means preferably consists of projections 56 on the frames 32 and 33 which enter notches in the opposite sides of the ejector when the frames are brought together. These projections and notches are preferably inclined or wedge shaped and are located in a position such that they force the ejector tightly against the bottom edges of the half molds, thereby closing the bottom of the molding cavities so tightly that none of the batter can escape. Preferably the cavities in the molds are enlarged at their lower ends by grooves 57, as shown in Fig. 4, into which the batter may flow and, when baked, form a bead which thickens and strengthens the rim of the cup. The ejector is adapted to be elevated, when the half molds are separated, into the position shown in Figs. 3 and 9. To secure this result the ejector is attached to rods 58, 59, near its opposite ends, which pass through guides 60, 61, respectively attached to the base 38 of the molding unit, and project to considerable distance below such base, their lower ends being joined to a crossbar 62. Crossbar 62 is equipped with a lug 63, which carries an antifriction roll 64 adapted to be engaged by a lever 66, hereinafter described. When such lever is raised, by means hereinafter described, it raises the crossbar 62, rods 58, 59 and ejector 55 into the position shown in Figs. 3 and 9 thereby removing the baked cups from the cores and discharging them into the receptacle 67, shown in Fig. 9. The half molds are opened to permit this ejection of the baked cups, and are subsequently closed to receive the batter and to confine the same during the baking process, by means of the following mechanism: A double link 68 consisting of two duplicate bars is connected with the frame 32 and with a rocker 69, which is pivoted on a pin 70 carried by a bracket 71 fixed to the turntable 1. The connection between the link and frame 32 is made by a pivot pin 73 mounted in lugs 74 on the frame 32, while the connection of the link with rocker 69 is made by pin 75 mounted in lugs 76 on the rocker. A similar link 77 is connected with the frame 33 by means of a pin 78 mounted in lugs 79 of the frame, while the opposite end of such link 77 is connected with a pivot pin 80 mounted in a lever 81 which is pivoted to a pin 82 mounted in lugs 83 of the rocker 69. Lever 81 carries an antifriction roll 84 on its end. The bars which constitute the link 77 lie outside of the bar 68 and also outside of the rocker 69 and lever 81, whereby they are able to move into and out of the same plane with the link 68 without interfering with any part. It will be noted that the links 66, 67 and lever 81 constitute a toggle mechanism of which the pivot 80 is the knuckle and the rocker 69 is a shifting fulcrum. When the lever 81 is depressed, as shown in full lines in Fig. 3, the link 77 is moved outward and at the same time the rocker 69 and the link 68 are moved inward, with respect to the axis of the turntable, whereby the frames 32, 33 are swung apart and the half molds are separated. The upward movement of lever 81 produces a contrary effect, drawing in the link 77 and pushing the link 68 outward until the half molds are brought firmly together. When this result occurs the pivots of the toggle mechanism are substantially in line, or the pivot 82 is far enough above the line of centers to lock the mechanism, whereby the half molds are held firmly together without possibility of accidentally separating. An adjustment is provided to render certain tight closing of the mold and the movement of the toggle mechanism into locking position. To make this adjustment I form each of the bars of which the link 77 is constituted in two parts, as shown in Figs. 3 and 4, one of which parts lies over the other and is provided with a slot 85 to which a clamping screw 86 passes, such screw being threaded into the other part. These two parts are provided with lugs 87 and 88, respectively, through which passes an adjusting screw 89 having a head 90 bearing against the outer side of the lug 88 and having a threaded shank which screws into the lug 87. The adjustment accomplished by screw 89 enables powerful pressure to be exerted in closing the half molds and secures the tension necessary to retain the toggle mechanism in the locked position, while the clamp screw 86 insures that the outer swinging frame and half mold will be thrown far enough outward to clear the baked cups when the latter are ejected.

Frames 32 and 33 are provided with lugs 91 and 92 adapted to strike on the base 38 and limit their outward movement. As the fulcrum of the toggle linkage is a floating one, some provision, such as these lugs or equivalent means, is required to limit the outward movement of each swinging frame and insure that both frames will be moved when the mold is opened. It is easily seen that if one of the frames should stick and if no means were provided to limit the movement of the other frame, the entire movement produced by the toggle linkage might be transmitted to the freely moving frame, causing the latter to swing farther than necessary, and not moving the other frame at all. It generally happens that one of the frames moves more readily than the other, so that when the toggle linkage is first operated the more easily movable frame is swung about its axis until its lug stops it, whereupon further movement of the toggle linkage swings the other frame.

For operating the toggle mechanism and thereby opening and closing the molds I provide cams 93 (Fig. 3) and 94 (Fig. 2). Such cams in the present embodiment of the machine are inclined plates or wings which are fast to the central column 3 of the machine and project into the path wherein the roll 83 travels in its revolution about the column. The cam 93 which is arranged to be engaged by the roll 84 just before the molding unit comes into discharging position, has its under surface extending from a point above the elevated position of the roll on a downward slant in the direction of revolution. Consequently the roll encounters the under surface of the cam at the high end of the latter and in traveling along the surface of the cam is depressed, being brought into the position shown in full lines in Fig. 3 by the time the molding unit stops in the discharging position. The cam 94 is located between the discharging and filling positions and is arranged reversely to cam 93. Its upper surface extends from a point below the depressed position of roll 84 on an upward slant in the direction of revolution to a point high enough to raise the lever 81 into the locking position shown in dotted lines in Fig. 3 and in full lines in Figs. 2 and 8. Each molding unit is equipped with a toggle linkage equivalent to that described and the two cams 93 and 94 serve to operate the toggle mechanisms of all the molding units in succession. Thus each molding unit is automatically opened as it comes into discharging position and is again automatically closed before arriving at filling position. The toggle mechanism above described, except for the automatic operating means, is generally similar, although differing in some features, to that shown and claimed in my Patent No. 1,097,576, dated May 19, 1914, wherein I have shown a single mold with means for manual operation to open and close it.

The means for filling or charging the molds consists of a set of mechanisms equivalent to pumps, which may for convenience of description be called pumps in this specification, which are equal in number to the mold cavities or elements of each molding unit and are so mounted as to coöperate with said cavities when the molding unit is in charging position. For illustration of the charging or filling mechanism reference is directed to Figs. 2, 5, 6, and 7. The batter, or other fluid or plastic material which is to be treated in the machine, is contained in a tank 95, which is supported by a post 96 at the front of the machine and is adapted to have a limited up and down movement with respect to the post. It is secured to a plate 97, with which is connected a lug 98 having pivot engagement 99 with a lever 100 pivoted at 101 on the bracket 102 on top of the post 96. The plate 97 is connected to two rods 103 arranged to move endwise vertically in guiding sleeves 104 made as parts of a bracket 105 secured to the post 96 and projecting over the charging position of the molds. From the bottom of the tank, tubes 106 extend downwardly and enter telescopically other tubes 107 which contain measuring chambers and, for convenience, in the present description may be termed "measuring tubes". Each of the measuring tubes carries a projecting arm 108, which receives a rod 109 suitably attached to the plate 97 and projecting downwardly therefrom parallel to the tube 96 and through an eye in the arm 108. The spring 110 surrounding each tube 106 bears on the plate 97 and against the upper edge of the corresponding measuring tube 107 tending to lower the latter, the downward movement of which is limited by an adjustable abutment in the form of a nut 111 threaded on the rod 109 below the arm 108. One of the measuring tubes or devices is shown in Fig. 10. The measuring chamber in such tube is designated 112 and is bounded at one end by a valve 113, and its other end by a valve 114. The valve 113 seats against a partition 115 mounted in the inner or conducting tube 106, and is pressed against the under side of such partition to close the aperture 116 by a spring 117 which abuts against a lip or apertured end wall 118 of the conducting tube 106. Valve 114 seats against the under side of a partition 119 fixed in the measuring tube 107, closing the aperture 120 in such partition and being pressed toward its seat on the under side of the partition by a spring 121 which reacts against a lip or end wall 122 at the bottom of the measuring tube. An outer sleeve 123 is fixed to the lower part of the measuring tube by a set screw 124 and has a contracted lower end provided with an orifice 125, which makes a delivering nozzle. It will be observed that the valves 113 and 114 close upwardly, preventing upward flow of the latter from the measuring chamber 112 and preventing air from entering such chamber, respectively, while they are adapted to yield when the pressure acting downwardly upon them is greater than the force of the springs which tend to seat them. The various measuring tubes are located in vertical alinement with the corresponding mold chambers of any molding unit which occupies the charging position. Normally the measuring tubes are elevated above the molding unit so that the latter may pass readily into charging position beneath them. Then when the lever 100 is actuated by means presently to be described, the batter tank and measuring tubes are lowered, bringing the nozzle of each measuring tube into contact with the molding unit, in registry with the orifice of the corresponding mold chamber or cavity. The motion given by the lever 100 is sufficient to produce further movement of the conducting tubes 106 after the measuring tubes have been arrested by contact with the mold, whereupon the batter in each chamber 112 is forced out of that chamber past the valve 114 and so through the nozzle 115 and into the mold chamber with which it registers. At this time the valve 113 is closed and prevents the batter from being forced back toward the tank. In this operation the rods 109 are lowered and the nuts 111 separated from the arms 108. When the tank is raised the spring 110 holds the measuring tube against the mold until the nut 111 brings up against the arm 108 and raises the measuring tube. In other words, the spring 110 produces a relative movement between the measuring tube and conducting tube, causing the chamber 112 to be extended to its normal length and drawing a fresh charge of batter into such chamber. The valve 114 is then closed and maintains sufficient vacuum in chamber 112 to cause unseating of the valve 113 and the flow of the batter thereinto. Adjustment of the nut 111 regulates the amount of movement permitted to the tube 107 relatively to the tube 106 and thereby regulates the charge which is ejected.

I will now describe the mechanism for oscillating the lever 100 and producing the described charging operation. In the present embodiment of the machine this mechanism comprises a cam 126 (see Fig. 1) which is mounted on the shaft carrying the worm wheel 18, previously described. Said cam has a groove in its under side which contains a roll 127 carried by a connecting rod 128, which rod has a wrist connection at 129 with an arm 130 carried by a rock shaft 131 having a bearing in a sleeve 132 rigidly mounted on the post 96. A second arm 133 rigidly connected with the arm 130, either directly or through the rock shaft 131, has a wrist connection with a link 134 which is pivoted at 135 to the lever 100. The arms 130 and 133 are slotted so that the wrist pins or pivots through which they are connected with the connecting rod 128 and link 134, respectively, may be shifted toward and from the rock shaft so as to vary the angle of oscillation of the rock shaft and the throw of lever 100, respectively. It will be observed that the cam 126 has one offset in its cam groove and that it rotates in the same time with the wheel 18 which operates the table indexing mechanism. Thus upon each indexing movement of the table the batter feeder is operated to charge the molds which have been brought under the batter receptacle by that movement. The cam is of course set so that the feeding of the batter is accomplished while the turntable is stationary. The rock shaft 131 is also used as a part of the transmission mechanism for oscillating the lever 66, already described, in connection with the ejector which discharges the baked cones. Lever 66 is mounted on a pivot 136 which is fixed in a bracket 137 that rises from the machine base 12. Near the bracket and permissibly formed as a part of it is a bearing 138 in which a rock shaft 139 is adapted to turn. This rock shaft carries an arm 140 which is connected with a link 141, the latter being connected by a pivot 145 with the lever 66. Arm 140 and lever 66 have slots 142 and 143, respectively, in which the pivot pins 144 and 145 of the opposite ends of the link are held adjustably so as to permit alteration and adjustment of the throw and position of lever 66. Fixed to the rock shaft 139 is another arm 146 with which a link or connecting rod 147 is pivotally joined. Said link is also joined pivotally with a third arm 148 on the rock shaft 131. It will be readily seen that a back and forth oscillation of the rock shaft 131, accomplished by the cam 126 has the effect of raising and lowering lever 66. Said lever has a notched or forked free end, of which the notch 149 is normally in the path of travel of the rolls 64 which are connected with the respective cone ejectors of the several molding units. The normal position of the lever 66 is the depressed one shown in dotted lines in Fig. 3 and in that position the roll 64 of the approaching molding unit is adapted to enter its notch as the molding unit reaches discharging position. When thereafter the lever 66 is raised and lowered, it raises and lowers the cone stripper or ejector 55 as already described. Roll 64 is brought into the plane in which the lever 66 oscillates, when the molding unit is in discharging position, and therefore the roll is retained in the notch 149 throughout the whole range of such oscillation. When the molding unit is farther advanced after its contents have been ejected, the roll 64 passes readily out of the notch in the lever, and the roll carried by the next molding unit passes into such notch.

After the molds have been charged the batter contained in them must of course be baked. The baking operation is carried out in an oven 150 which is of annular form concentric with the center of the turntable and of such dimensions as to receive the molding units. Preferably the oven is an annular box closed at the top and at the inner and outer sides but open at the bottom. It is supported by posts 151 at a level above the ends of the mold carrying arms 2, so that the molds rise from such arms through the open bottom into the interior of the oven. Heat for baking the cones is furnished by gas jets issuing from pipes 152 and 153 arranged near the inner and outer walls and near the bottom of the oven as shown in Fig. 8, between which the molds pass. These pipes are fed from a main 154 by connections 155 and 156. The oven is interrupted for a portion of its extent sufficient to permit ejection of the baked cones and charging of the molds. Consequently one termination of the oven is near the discharging position and the other termination is near the filling position, as shown in Fig. 1, such positions of the molds being between the ends of the oven. Such ends are open so that the molding units are enabled to pass readily into and out of the oven. It is contemplated also to provide means additional to the oven for heating the molds, and for this purpose I provide each of the arms 2 with a gas pipe 157 which feeds nozzles 158 so arranged as to direct jets of flame against the bases of the molds and cores, whereby both to keep the molds hot while out of the oven and to augment the heating effect produced by the oven. A gas burner 158ª is arranged beneath the crossbar 39 and extends practically the whole length of the mold between the guide sleeves 43, 44. It is fed with gas through a pipe 158ᵇ from the pipe 157 and is supplied with outlets from which flames issue and play against the crossbar 30 and the cores secured thereto. Where cores of the sort shown in Fig. 12 are used, the depending bases of the plugs of such cores are heated by the flames from the burner 158ª. The pipe 157 is supplied by the main 154 through a swivel connection 159 in the axis of the turntable.

An important feature of the invention resides in the means for closing the orifices of the molds after charging whereby to prevent escape of the batter when it begins to boil and swell upon being heated. The batter of course is in a liquid condition and cold when introduced into the molds. Not enough of the batter is admitted to fill the spaces in the molds between the walls thereof and the cores when the batter is cold, because the generation of steam and gases during baking is depended upon to fill these spaces with the batter. If the molding spaces were entirely filled in the first place there would be an excess of batter which would boil over when heated and be wasted. Accordingly I provide covers adapted to close the orifices of the mold spaces when the latter have been charged, and provide means for automatically opening such covers before charging and closing the covers after charging. The covers are shown at 160. They are carried by a bar 161, being conveniently formed as lugs or ears integral with said bar and bent so as to lie over the ends of the mold chambers. Each molding unit is provided with such a bar, which is mounted on the half mold 33 with provision for movement endwise, being conveniently held by guide brackets 162 fixed to the outer side of the half mold 30 near the ends thereof. The limited endwise movement of the bar 161 is sufficient to move the cover pieces 160 respectively aside from and over the orifices of the mold chambers. A rocker 163 carrying an antifriction roll 164 is connected with the bar 161 by a link 165. A cam 166 is fixed upon a bar 167 which is attached to the rods 103 already described as being connected and movable with the tank 95. Said cam 166 has an inclined edge or surface which is directly above the roll 164 when the molding unit is in filling or charging position. When the tank is depressed to charge the mold the cam 166 strikes roll 164 and moves the bar 161 to one side, in the direction required to uncover the orifices of the mold chambers. Upon the upward movement of the tank a dog 168 strikes the under and opposite side of the roll 164 and returns the covers to closed position. Dog 168 is pivoted to a tongue 169 which hangs down from the bar 167. The dog is equipped with an inclined lip or plate under which the roll 164 passes when the molding unit comes into filling position. The dog then rides up over the mold and falls back of it when the molding unit comes to a stop. The covers thus provided and operated close the filling openings of the molding chambers tightly enough to prevent the batter from exuding during the baking and confine the pressure generated by the heat in the mold so as to compel the batter to fill all unoccupied spaces within the mold. In this way I am enabled to produce perfect cones without waste of the batter.

The molding unit which is being charged is supported during the charging operation by a post 170 carrying a vertical antifriction roll 171 at its upper end which underlies the outer end of the mold carrying arm 2 which is in the filling position. The base of this arm supports a fixed cam member 172 which serves to raise the cores into the normal position which they occupy during baking. This cam device acts on a roll 173 (Figs. 6 and 7) carried by a downwardly hanging arm 49ª of the lever 49, previously described, which acts on the bar 45 supporting the mold cores. As the molding unit comes into the charging position the roll 173 travels up on the cam projection 172, thereby swinging lever 49 until its upper arm is vertical, thus causing the roll 52 to rise in contact with the contact plate 53 of the crossbar 45, raising such bar. The lever carries a lug 174 which overlies the bracket 51 whereon the lever 49 is pivoted, and by engaging the edge of such bracket limits the movement of the lever, so that it can not swing more than a slight distance beyond the vertical and hence can not fall over on the other side beyond the vertical position. Thus the lug 174 and the downward pressure of the crossbar 45 together lock the lever 49 in the position where it rigidly supports the cores. Just before the molding unit reaches discharging position the lug 174 strikes a finger 175 mounted upon the post 151ª at the right hand side of the machine, this post being one of those which support the oven. The finger 175 is in the path traveled by the lug 174, and it holds back such lug while the molding unit passes on, whereby a relative movement of the lever 149 into the position shown in Figs. 6 and 7 is produced. The lug 174 is thus lowered and passes under the finger 175. Thereby the rigid support for the cores is withdrawn and the cores are allowed to descend slightly by the action of their own weight and of the springs 47, until they are arrested by the bar 39 which carries the cores coming into contact with the guiding sleeves 43, 44. Thus the cores are freed from the baked cones immediately before the molds are opened.

176 (Figs. 1 and 2) represents a brush which is secured to the top of the oven and has bristles of an incombustible and a sufficiently stiff material, such as steel wire. Such bristles project through an opening in the top of the oven far enough to sweep over the top of the molds as they travel under the brush. The purpose of the brush is to remove any drops of batter which may have dripped from the charging tubes and lodged on the tops or covers of the molds. The brush is located near the farther end of the oven so that such drops or particles of batter will have become baked and may be easily removable by the time the molds pass the brush.

The manner and sequence of operation will have been readily understood from the foregoing detailed description of mechanisms. The ratchet and pawl driving mechanism 18, 21, 22 and 25 gives the turntable a step by step rotation, with pauses between the steps, each step of which brings one filled molding unit out of the oven into the discharging position, brings another empty molding unit into the charging position, and brings a molding unit which had been charged during the preceding dwell into the oven. Those molding units already in the oven are moved step by step until they finally emerge into the discharging position, being continuously subjected to the heat of the flames in the oven from the time they enter until they emerge. When each molding unit commences the last step of its travel to the discharging position the finger 175 acts to permit withdrawal of the cores to free them from the baked cones. Then just before the molding unit reaches the discharging position the cam 93 opens the half molds and leaves the cups resting freely upon the ejector bar 55. When in the discharging position the lever 66 is operated by the cam 126 through the rod 128, rock shaft 131, link 147, and rock shaft 149 to raise the ejector bar and the baked cones resting thereon. When the cones are so raised their upper ends strike the inclined overhanging deflector 176 attached to the inner end of the receptacle 67, and by that deflector are swung outwardly as shown by dotted lines in Fig. 9 until they fall upon their sides on a lip 177 which projects rearwardly from the bottom of the receptacle. Gravity then causes the cups to slide along the inclined bottom of the receptacle until they are arrested by the outer wall 178 thereof. The receptacle is provided with partitions 179, as shown in Fig. 11, which divide it into compartments equal in number to the number of mold cavities in each molding unit, and the deflector has division walls 180 which provide channels alined with the spaces of the receptacle, whereby the cones from each molding cavity are caused to enter the proper compartment in the receptacle and are automatically nested with cones previously discharged, in an orderly manner, all as indicated in Fig. 9. A further step, or as in the present machine, two further steps, bring the emptied molding unit into the filling position. Before arriving in the latter position the cam 94 closes the half molds and the cam projection 172 raises the cores. Then the cam 126 actuates the rod 128, arms 130 and 133, link 134 and lever 100 to depress the batter receptacle and eject charges of the batter into each of the mold cavities. This charging operation of course takes place at the same time that the discharge of the cones from another molding unit occurs.

It is to be understood that the essential principles embodied in the apparatus hereinbefore described may also be embodied in machines and mechanisms modified in various ways without departing from the spirit of the invention. In the machine here illustrated there are twelve molding units, three of which are out of the oven at any one time and the other nine of which are in the oven. This provides for a stoppage of the molding unit in an intermediate position between the discharging and filling positions which may be utilized, if desired, to grease the mold. Or, if desired, the discharging and filling positions may be made contiguous to each other and the oven might then be continued to contain ten of the molding units at one time. As the machine is shown here the molds are contained in the oven during three-fourths of the time required for a complete cycle of the machine. I have found that this gives sufficient time for thorough baking at the speed of operation which I have adopted. The speed of operation of course may be varied and so may the number of molding units and the actual length of time which such units remain in the oven, without departing from the spirit of the invention.

I desire to note that the terms "vertical," "upward," "downward," "movable," and "stationary" are all relative and are used without limiting significance. Although in the machine as here shown the turntable rotates in a horizontal plane about a vertical axis, and the ejector plate which forms the bottom of the mold is movable up and down, that is vertically, yet I desire it understood that I do not limit the invention to a machine in which the parts are so arranged. The essential meaning of "vertical" or "up" and "down" as used with respect to the ejector plate 55 is that of motion in a direction transverse to that in which the parts of the mold move in opening and closing, and when these terms are used in the claims as applied to the ejector I intend that they shall be construed with this meaning. Substantially the same thing is true with respect to the movement of the batter tank or charging device and the measuring and ejecting tubes connected therewith. The condition essential to this invention is that the charging device shall be so moved that the discharge nozzles thereof approach and recede from the admission orifices of the molding unit which is in charging position. It is not essential, although convenient, that this movement should be vertical and that the admission orifice of the molding unit should be at the top, because a positive force is applied by means of the valves 113 and 114 to eject the batter and to refill the measuring tubes, so that the vertical relation is not essential for this purpose. That is, the conducting and measuring tubes could be arranged horizontally and could move horizontally with operative effect, provided only the batter tank is so arranged that the batter therein rises above the inlets to the conducting tubes 106. Consequently the terms "above" and "below," "upward" and "downward," used in the claims to describe the relation and movement of the charging device with respect to the molding unit are relative and not limiting.

In the claims I have recited the mechanism consisting of the lever 66, rock shaft 139, arm 140 and link 141, which actuates the ejector, as being stationary. This term is used in the same sense as commonly used in reference to a stationary engine, to mean that the mechanism as a whole does not change its location, but not meaning that the parts of the mechanism are not movable.

What I claim and desire to secure by Letters Patent is:—

1. An automatic baking apparatus comprising a rotating turntable, a plurality of molding units mounted on said turntable and movable therewith about a common axis, an oven concentric with such axis and closed on three sides and open at the side adjacent to that part of the turntable whereon the molding units are supported, whereby said molding units are adapted to project into the oven, means for generating heat within the oven, mechanism for rotating said turntable with a step by step motion, each of said molding units including separable half molds containing a plurality of molding cavities, cores mounted between said half molds in each of said cavities, an ejector arranged to close the bottom of the space between said half molds and cores, means for withdrawing the cores of one of said units prior to the arrival of such unit in a definite discharging position, means for separating the half molds prior to arrival of such unit in such position, means for raising said ejector to remove the baked articles when in such position, a batter container located over another definite stopping position of the molding units, pumping devices projecting downwardly from said container and communicating therewith, and means for so moving said container and pumping devices as to bring said devices into connection with the molding unit beneath the same and eject measured quantities of the batter into the mold cavities of such unit.

2. An automatic baking machine comprising a plurality of molding units each comprising a pair of half molds movable together and apart and containing cavities which when the half molds are brought together constitute molding chambers, said chambers having admission openings at the top of the half molds, a turntable on which said molding units are supported, an ejector plate underlying said half molds and forming the bottom of the molding chambers therein, said ejector plate having apertures centrally disposed with respect to said chambers, cores in the several molding chambers extending through said apertures and filling the same, guiding and connecting means attached to said ejector plate arranged to permit an up and down movement thereof, guiding and connecting means attached to said cores also arranged to permit and produce an up and down movement of said cores, mechanism for giving a step by step rotation to said turntable and permitting the same to pause with the molding units thereof in certain definite positions, mechanism adjacent to one of such positions for causing downward movement of the cores, mechanism adjacent to another position for causing upward movement of the cores, mechanism adjacent to one of said positions arranged to engage the guiding and connecting means of said ejector for raising and lowering the same when the molding unit is in one of such positions, means adjacent to one of such positions for causing separation of the half molds and means adjacent to another of such positions for closing the half molds together.

3. An automatic baking machine including in its construction a rotatable carrier, a molding unit mounted upon said carrier including frames mounted to swing on substantially horizontal and parallel axes which are approximately perpendicular to a line from said unit to the axis of the carrier toward and from one another, partial molds mounted upon said frames above said axes and constructed so as to form a complete mold when the frames are brought together and to be separated when the frames are swung apart, links connected to the respective frames, a rocker mounted upon the carrier on a pivot parallel to the axes of said frames to which one of said links is connected, a lever pivoted to said rocker, to which ever the other of said links is connected, and a cam means arranged in the path of a portion of said lever arranged to swing the same whereby to shift said links and thereby produce relative movement between the swinging frames and partial molds.

4. A baking machine including a rotating carrier, a divided mold having two parts, holders for said parts mounted upon said carrier and movable toward and from one another substantially radially of the axis about which the carrier rotates, a fulcrum member mounted upon said carrier, a lever pivoted to said fulcrum member, a link connecting said fulcrum member with one of said mold holders, a link connecting said lever with the other of said mold holders, whereby when said lever is swung the fulcrum member is moved and the mold holders are moved relatively to each other, and a stationary cam arranged in the path of a portion of said lever for oscillating the same in the movement of the carrier.

5. A molding and baking machine including in its construction a mold carrier, a mold mounted on said carrier having an internal molding chamber with an orifice at the top, means for moving said mold carrier with a step by step motion and causing the same to stop in definite locations, means for causing the contents of said mold to be ejected at one of such locations, a batter container mounted over another one of such locations of said mold, a charging tube extending from the batter container in line with the external orifice of said mold and having a discharge nozzle, said container and charging tube being together movable in line with the mold orifice and to an extent more than sufficient to bring the outlet of the discharge tube in contact with the mold and in registry with the orifice thereof, and means for moving said receptacle and tube down and up, the lower end of the discharge tube having a telescopic movement with respect to the upper part of said tube, whereby it is arrested by the mold while the receptacle continues in motion, and the portions of said tube having valves arranged to cause ejection of the batter during such relative movement.

6. In an automatic machine for molding and baking articles, a mold carrier movable rotatably about an axis, a divided mold, holders on which the parts of said mold are respectively mounted, said holders being movably mounted on said carrier with provision for movement toward and from one another radially of the axis of said carrier, links pivoted to said holders respectively, a lever pivotally mounted upon the carrier and movable radially thereof and connected with the links respectively, said links and lever together constituting a toggle joint operable by movement of the lever to move the mold holders together and apart, means for moving said carrier to transport the mold and toggle joint, and a cam in the path of movement of said lever for engaging the latter to displace the same and thereby operate the toggle joint.

7. In a machine of the character described, a mold carrier, a plurality of molding units mounted upon said carrier, means for moving said carrier intermittently, whereby to cause the molding units to stop successively in certain predetermined positions, a batter container located above one of said positions, conducting tubes leading downwardly from said container, measuring tubes mounted telescopically upon said conducting tubes and having provision for movement thereon, said measuring tubes having outlets adapted to register with the intakes of the molding unit beneath the same, upwardly closing valves associated with said conducting and measuring tubes, respectively, whereby a relative upward movement of the measuring tube expels the batter therefrom and a relatively downward movement of said measuring tube causes it to be filled, and mechanism for producing downward and upward movements of the container and tubes toward and from the molding unit, the latter being so placed that the measuring tubes engage the same and are arrested before the completion of a downward movement of the container and conducting tubes.

8. In a machine of the character described, a molding unit comprising a divided mold formed of separable sections, holders for said sections movable together and apart, an ejector plate normally located between said holders at the bottom of the mold, and a core passing through said ejector into the mold; a rotatable carrier by which said molding unit is carried, means for giving the core a limited downward and upward movement, automatic means for separating the mold holders and therewith the parts of the mold when the carrier brings the molding unit into a certain position, and means for causing the ejector when the molding unit is in such position and the parts of the mold are separated.

9. In a machine of the character described, a molding unit comprising a divided mold formed of separable sections, holders for said sections movable together and apart, an ejector plate normally located between said holders at the bottom of the mold, and a core passing through said ejector into the mold; a rotatable carrier on which said unit is mounted, means for giving the core a limited downward and upward movement, means operable by the travel of said unit for separating the mold holders and therewith the parts of the mold, and means for raising the ejector when the unit is in a certain position and the parts of the mold, are separated, said ejector and mold holders having interlocking portions adapted to secure the ejector in a definite position when the holders are brought together.

10. In an automatic baking machine in combination, a carrier, a mold mounted on said carrier, means for moving said carrier step by step to bring said mold successively into different positions, a mold charging device located near one of the positions of said mold, said mold having an orifice in its top and a charging device having an outlet, means for bringing the outlet of said charging device into registry with said orifice whereby to inject the material to be baked into the mold, a cover adapted to overlie and close the mold orifice, a holder for said cover mounted upon the mold and movable laterally, an automatic mechanism associated with said charging device for so moving said cover carrier as to displace the cover from its contiguous orifice prior to injection of the material and to return the cover over such orifice when the charging device is withdrawn.

11. In a machine of the character described, a mold having a charging orifice, a cover adapted to close said orifice, and being displaceable so as to open the orifice, a charging device having an outlet, means for moving said charging device to bring its outlet into registry with the mold, and mechanism associated with said means for displacing said cover when the device approaches the mold and replacing the cover when the charging device is withdrawn from the mold.

12. A machine of the character described, comprising an oven, means for heating the oven, a plurality of molding units, an ejector associated with each of said units, a carrier for said units movable to cause said units to enter successively one end of the oven, to travel through the oven and to emerge from the opposite end thereof, a charging device adjacent to the entrance end of the oven arranged above the path in which the molding units pass, mechanism for moving said carrier step by step and causing the molding units to pause successively beneath such charging device, means for ejecting the material to be baked from said charging device into the molding unit, and means adjacent to the outlet end of the oven for actuating said ejector to remove the baked articles from the molding units upon emergence of such units from the oven.

13. In a baking machine, a plurality of molding units, each comprising separable mold sections, a bottom piece movable longitudinary of the molding unit, a carrier for said molding units, means for moving said carrier intermittently and causing the same to stop when the several units successively arrive in the same position, means for separating the mold sections of each unit prior to arrival of the unit in such position, an extension passing from the bottom piece of each unit parallel to the line of movement of said unit, and a stationary operating mechanism including a lever movable in a plane parallel to the line of movement of said bottom piece, said extension and operating mechanism having engaging elements adapted to be engaged when the molding unit arrives in the aforesaid position and to be disengaged when the unit leaves such position.

14. In a machine of the character described, a traveling mold carrier, a plurality of molds, each composed of separable portions mounted upon said carrier, a vertically movable ejector constituting the bottom of each mold, said ejector being movable from the bottom toward the top of the mold, an extension depending from said ejector, a stationary operating mechanism for actuating the ejectors of all the molds including a rock arm and means for moving the same upwardly and downwardly, said arm having a jaw, and the extension of each ejector having a projection adapted to enter said jaw when the several molds are brought successively into the same position relatively to said arm, and to leave the jaw when the mold leaves such position.

15. In a machine of the character described, a movable mold carrier, a plurality of molding units mounted upon said carrier and each including complemental separable members together forming a complete mold, an ejector arranged to constitute the bottom of such mold and movable back and forth in a direction transverse to that in which the parts of the mold move in separating, and an extension connected with said bottom; means for moving said carrier step by step and causing all the molding units to stop in the same position, stationary mechanism located near one of the stopping positions of the molding units constructed and arranged to cause separation of the parts of the mold as each unit approaches such position, and a stationary actuator including a relatively movable arm having a portion arranged to engage with the extension of each unit when the unit is in said position, and means for moving the said engaging portion of said actuator when thus engaged with said extension in the direction in which said bottom member is moved.

16. A molding apparatus including a molding unit having an admission opening, a carrier for said unit movable to place the latter in a number of different positions, a charging device located adjacent to one of such positions and having a projecting pump, comprising telescopically arranged tubes and an outwardly opening valve in each tube, means for moving said charging device and pump toward and from the molding unit through a distance greater than the distance between said pump and said unit and bringing the outlet of the pump into registry with the admission orifice of the mold, whereby said pump is automatically actuated by contact with the mold to inject a charge of batter into the mold.

17. In a baking apparatus, a mold comprising separable sections, means for transporting said mold and stopping it in definite positions, a receptacle located opposite one of the stopping positions of said mold, having a bottom extending on an outward and downward slant from a point above said mold, and including also a deflector extending on an upward slant from a point at the inner side of said mold, and an ejector supporting the article baked in the mold and means for raising such ejector when the parts of the mold are separated, whereby the articles so raised are caused to strike said deflector and are overturned and allowed to fall into said receptacle.

18. A baking machine comprising an annular oven, a carrier rotatably mounted on an axis centrally disposed with respect to said oven, said carrier having a portion extending under the oven, the oven being closed at its top and its outer and inner sides and open at its under side and also at its ends, being carried through less than a complete circle, a molding unit mounted upon said carrier and rising therefrom, adapted to pass through the open under side of the oven and to enter one end and emerge from the opposite end of the oven during rotation of the carrier, means for giving the carrier a step by step rotation and constructed to cause the carrier to pause when the mold has passed out of the oven, and to pause again when the mold is at a different position near the entrance end of the oven, said mold comprising separable sections divided on a plane approximately perpendicular to a line drawn from the axis of the carrier to the mold, an ejector normally closing the bottom of the mold and mounted with provision for vertical movement between the parts of the mold when the latter are separated, an arm having a forked end oscillatively mounted in a fixed bearing adjacent to the outlet end of the oven, a projection connected with said ejector plate arranged to enter the forked end of said arm when the mold is arrested upon emergence from the oven, automatic mechanism for separating the parts of the mold upon arrival thereof at the said position of arrest, and means for giving said arm an up and down oscillation, whereby the ejector is caused to remove the contents of the mold.

19. In a baking apparatus, a traveling carrier, a mold mounted upon said carrier and composed of separable sections, an oven, means for moving said carrier with a step by step motion so as to carry the mold through said oven and cause arrest of the carrier upon emergence of the mold from the oven, an ejector located at the bottom of the mold, an ejector operator located adjacent to the stopping place of the mold upon its emergence from the oven, said ejector and operator having portions arranged to become interengaged upon arrival at the said stopping place, and mechanism for intermittently operating said ejector timed to operate the latter after arrival of the mold in said stopping place, whereby to cause the ejector to displace the baked contents of the mold.

20. In a molding and baking apparatus the combination of a traveling carrier, a mold mounted upon said carrier and having a charging inlet, a core within the mold so disposed as to provide a conical annular space between itself and the walls of the mold communicating with said inlet, an oven arranged in the path of movement of said mold and adapted to receive the latter in the course of the latter's travel, a cover arranged adjacent to the charging inlet of the mold and movable over and aside from such inlet, while said core remains in the mold, automatic mechanism for displacing the cover from the inlet and returning it over the inlet, and means for charging the mold while the cover is displaced from the inlet.

21. In a molding and baking apparatus the combination of a traveling carrier, a mold mounted upon said carrier and having a charging inlet at its top, an oven arranged in the path of movement of said mold and adapted to receive the latter in the course of the latter's travel, a cover arranged adjacent to the charging inlet of the mold and movable over and aside from such inlet, a charging device movable toward and into registry with said inlet and away from the same, and mechanism operated by said charging device for displacing said cover during the approaching movement of the charging device, and for replacing the cover over the inlet during the movement away of the charging device.

22. In a machine of the character described, the combination of an oven, a molding unit, a movable carrier on which said molding unit is mounted, said oven, unit and carrier, being arranged in such relation that the travel of the carrier carries the molding unit into and out of the oven, means for moving said carrier intermittently arranged to arrest the carrier after emergence of the unit from the oven, said unit including a divided mold having laterally separable portions and an ejector forming the bottom of said mold, automatic mechanism for separating the parts of the mold during the approach of the molding unit to its stopping position outside of the oven, and a stationary ejector actuator located adjacent to such stopping position, having a movable member arranged to make connection with said ejector when the unit arrives in such stopping position, and automatic mechanism operated intermittently and in timed relation with the carrier moving means for causing the movable member of said actuator to move the ejector in a manner such as to eject the contents of the mold.

23. In a machine for producing hollow molded articles, a mold divided into separable movably mounted parts, a core occupying a position within said mold such as to provide a batter-receiving space between itself and the walls of the mold, an ejector surrounding said core and closing one end of said batter-receiving space, means for injecting batter into such space while the core is in place, mechanism for separating the parts of said mold, and mechanism for so moving said ejector as to eject the contents of the mold.

24. In a machine for producing molded articles, a divided mold, the parts of which are separable, a core located in the interior of the mold and an ejector for the molded articles located between said parts and embracing said core, said parts and ejector having interlocking portions adapted to be engaged when the mold parts are closed together, for locating the ejector in a definite position.

25. In a machine for producing molded articles, a divided mold, the parts of which are separable and are internally recessed to provide a molding cavity, a member forming the bottom of said cavity and also constituting an ejector arranged between said parts, a core passing through said member into said cavity, said member and said parts having interlocking elements arranged to engage when the parts are closed together, for holding said member in a definite location, and means for projecting said member when the said parts are separated, whereby to eject the contents of the mold.

26. In a machine of the character described the combination of a mold having a charging inlet, a device for charging batter into the mold comprising a pump having a discharge nozzle and a measuring chamber and outwardly opening valves forming the limits of said chamber, the said nozzle and one of the valves being movable relatively to the other of said valves, mechanism for so moving said charging device as to bring its nozzle into contact with the mold and into registry with the inlet thereof, said mechanism being arranged to continue movement of the charging device after said nozzle has been arrested, whereby a relative movement between the valves of the measuring device is produced to cause a positive injection of the batter into the mold.

27. An automatic baking apparatus comprising an oven, a molding unit composed of separable mold sections inclosing a mold cavity, a core within said cavity and an ejector arranged to close one end of said cavity and mounted with capacity for movement toward the opposite end of the cavity, a carrier on which said unit is mounted, means for so moving said carrier as to transfer the unit into, through and out of the oven, means for causing a withdrawing movement of the core, means for separating the mold sections when the unit issues from the oven, and means for moving the ejector to remove the baked contents of the mold cavity while said sections are separated.

28. In a baking apparatus, a mold, a core projecting into said mold from the lower end thereof and being movable downwardly, a traveling carrier on which the mold is mounted, an abutment mounted on said carrier in engagement with said core normally holding the same elevated, and means operated during the travel of the carrier for displacing said abutment, whereby the core is permitted to descend and become disengaged from the contents of the mold.

29. In a baking apparatus, a mold, a core projecting into said mold from the lower end thereof and being movable downwardly, a traveling carrier on which the mold is mounted, an abutment mounted on said carrier in engagement with said core normally holding the same elevated, and means operated during the travel of the carrier for displacing said abutment, whereby the core is permitted to descend and become disengaged from the contents of the mold and means, also operated by the travel of the carrier for returning the abutment to its former position and thereby elevating the core.

30. In a baking apparatus, a mold composed of separable sections inclosing a mold cavity, a core projecting into said cavity from one end thereof and being movable outwardly from the cavity, yielding means tending constantly to withdraw said core, a traveling carrier on which the mold is mounted, a displaceable abutment also mounted on said carrier and normally arranged to bear on said core and hold the same projected into the mold cavity against the pressure of said yielding means, means operated by the travel of the carrier for displacing said abutment at a predetermined point in such travel, whereby said yielding means is enabled to give a movement of withdrawal to the core to disengage it from the contents of the mold, and means for separating the mold sections subsequent to such disengagement of the core.

In testimony whereof I have affixed my signature, in presence of two witnesses.

SAMUEL E. WINDER.

Witnesses:
ARTHUR H. BROWN,
P. W. PEZZETTI.